United States Patent
Shibagaki

(10) Patent No.: US 6,935,989 B2
(45) Date of Patent: Aug. 30, 2005

(54) CATALYST ACTIVATION CONTROLLING APPARATUS FOR EMISSION CONTROL CATALYST IN INTERNAL COMBUSTION ENGINE

(75) Inventor: Nobuyuki Shibagaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/452,125

(22) Filed: Jun. 3, 2003

(65) Prior Publication Data

US 2003/0232696 A1 Dec. 18, 2003

(30) Foreign Application Priority Data

Jun. 14, 2002 (JP) ........................ 2002-174449

(51) Int. Cl.⁷ .................. F16H 59/64; B60K 41/04; F01N 3/00
(52) U.S. Cl. ............... 477/98; 477/115; 60/285
(58) Field of Search .............. 60/277, 285; 477/97, 477/98, 100, 102, 109, 115, 902

(56) References Cited

U.S. PATENT DOCUMENTS

| | | | | |
|---|---|---|---|---|
| 3,895,541 A | * | 7/1975 | Nohira et al. ............... | 477/97 |
| 5,131,293 A | * | 7/1992 | Kaiser et al. ................ | 477/98 |
| 6,248,040 B1 | * | 6/2001 | Minowa et al. .............. | 477/98 |
| 6,276,131 B1 | * | 8/2001 | Ueno et al. .................. | 60/285 |
| 6,560,960 B2 | * | 5/2003 | Nishimura et al. .......... | 60/285 |
| 6,583,995 B2 | | 6/2003 | Kalman et al. | |
| 6,672,989 B2 | * | 1/2004 | Murata et al. ............... | 477/97 |
| 6,688,101 B2 | * | 2/2004 | Isobe et al. ................. | 60/277 |
| 6,725,650 B2 | * | 4/2004 | Nishimura .................. | 60/285 |

FOREIGN PATENT DOCUMENTS

| | | | | |
|---|---|---|---|---|
| JP | 404210159 A | * | 7/1992 | ............ 477/98 |
| JP | 404362353 A | * | 12/1992 | .......... 477/100 |
| JP | 6-257427 A | | 9/1994 | |
| JP | 7-167284 A | | 7/1995 | |
| WO | WO 03/028202 A1 | | 4/2003 | |

* cited by examiner

*Primary Examiner*—Roger L Pang
(74) *Attorney, Agent, or Firm*—Kenyon & Kenyon

(57) ABSTRACT

A clutch controlling device switches the degree of engagement of a clutch according to at least one of the running state of a vehicle, the running state of an engine, or the manipulation state of a gearbox. A detecting device detects the temperature of an emission control catalyst. When a clutch controlling device decreases the degree of engagement of the clutch, the clutch controlling device increases the degree of engagement of the clutch if the temperature of the catalyst detected by the detecting device is less than a reference temperature. Accordingly, the temperature of the catalyst is increased.

6 Claims, 10 Drawing Sheets

Fig.7

| Shift Position | | C1 | C2 | C0 | B1 | B2 | B3 | B0 |
|---|---|---|---|---|---|---|---|---|
| P | | (◯) | | ◯ | | | | |
| R | | | ◯ | ◯ | | | ◯ | |
| N | | (◯) | | ◯ | | | | |
| D | 1 | ◯ | | ◯ | | | | |
| | 2 | ◯ | | ◯ | | ◯ | | |
| | 3 | ◯ | ◯ | ◯ | | ◯ | | |
| | 4 | ◯ | ◯ | | | ◯ | | ◯ |
| 2 | 1 | ◯ | | ◯ | | | | |
| | 2 | ◯ | | ◯ | ◯ | ◯ | | |
| | 3 | ◯ | ◯ | ◯ | | ◯ | | |
| L | 1 | ◯ | | ◯ | | | ◯ | |
| | 2 | ◯ | | ◯ | ◯ | ◯ | | | though
CATALYST ACTIVATION CONTROLLING APPARATUS FOR EMISSION CONTROL CATALYST IN INTERNAL COMBUSTION ENGINE

BACKGROUND OF THE INVENTION

The present invention relates to an internal combustion engine that outputs power for driving a vehicle through a power transmission having a gearbox, and more particularly to an catalyst activation controlling apparatus for activating an emission control catalyst, which is located in an exhaust passage of the engine, based on the temperature of the catalyst.

A typical internal combustion engine for driving a vehicle is equipped with an emission control catalyst for purifying toxic from exhaust. When the temperature of the emission control catalyst is lowered, the exhaust cleaning efficiency is also lowered. This causes emission to deteriorate. Japanese Laid-Open Patent Publications No 7-167284 and No. 6-257427 disclose technology for maintaining a high temperature of an emission control catalyst. According to the technology, the gear ratio of an automatic transmission is changed to increase the speed of an engine when an emission control catalyst is not sufficiently heated by exhaust due to a low speed of the engine. The increased engine speed maintains a high temperature of the catalyst.

Incidentally, a "neutral control" for improving the fuel efficiency during idling is known in the art. In the neutral control, when the automatic transmission is shifted to a forward gear and the vehicle is not moving, a forward clutch in an automatic transmission is disengaged or engaging force applied to the forward clutch is decreased so that the clutch slips. This improves the fuel efficiency. When the neutral control is being performed, the exhaust temperature and the exhaust flow rate are lowered. Accordingly, the temperature of an emission control catalyst is lowered. This can lower the exhaust cleaning efficiency and therefore degrade the exhaust emission.

However, when the clutch is disengaged or is slipping, the engine speed cannot be increased by changing the gear ratio. The temperature of the emission control catalyst therefore cannot be prevented from dropping. When the vehicle is not moving, if the engine speed is increased with the intention of increasing the exhaust temperature and the exhaust flow rate, a significantly high engine speed must be maintained since the clutch is disengaged or is slipping and receives no or little load. This adversely affects the durability of the engine. Also, an increase of the engine speed when the vehicle is not moving can disturb the driver.

The similar case also occurs if a driver shifts an automatic transmission into a neutral range or a parking range when a vehicle is not moving. That is, when the engine load is lowered by disengaging the clutch, the exhaust temperature and the exhaust flow rate are lowered, accordingly. This lowers the temperature of the emission control catalyst and thus degrades the exhaust emission. As described above, it is not desirable to prevent deterioration of exhaust emission simply by increasing the engine speed.

Further, if an automatic transmission is shifted to a parking range or a neutral range immediately after an engine is started from a cold state, the engine load is relatively low. Thus, the exhaust temperature and the exhaust flow rate are not sufficiently high. This can prevent the temperature of an emission control catalyst from being increased to a sufficient level for activation or cause the temperature to increase to the level significantly slowly. In these cases, exhaust emission also deteriorates.

SUMMARY OF THE INVENTION

Accordingly, it is an objective of the present invention to maintain or increase the temperature of an emission control catalyst to a temperature sufficient for activating the catalyst when the load on an engine is small due to disengagement or slipping of a clutch.

To achieve the foregoing and other objectives and in accordance with the purpose of the present invention, a catalyst activation controlling apparatus for an emission control catalyst in an internal combustion engine is provided. The engine outputs vehicle driving power through a power transmission that includes a clutch. The clutch enables and disables a power transmission path between a driving wheel of a vehicle and the engine. The emission control catalyst is located in an exhaust passage of the engine. The apparatus activates the catalyst based on a temperature of the catalyst. The apparatus includes a clutch controlling device and a detecting device. The clutch controlling device switches a degree of engagement of the clutch according to at least one of a running state of the vehicle, a running state of the engine, and manipulation of the transmission by a driver. The detecting device detects the temperature of the emission control catalyst. When the clutch controlling device is decreasing the degree of engagement of the clutch, the clutch controlling device increases the degree of engagement of the clutch if the temperature of the emission control catalyst detected by the detecting device is less than a reference temperature.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is a chart for explaining the state of the automatic transmission in accordance with the shift position;

DETAILED DESCRIPTION OF THE PREFERRED EMBODIMENTS

Figure 1:
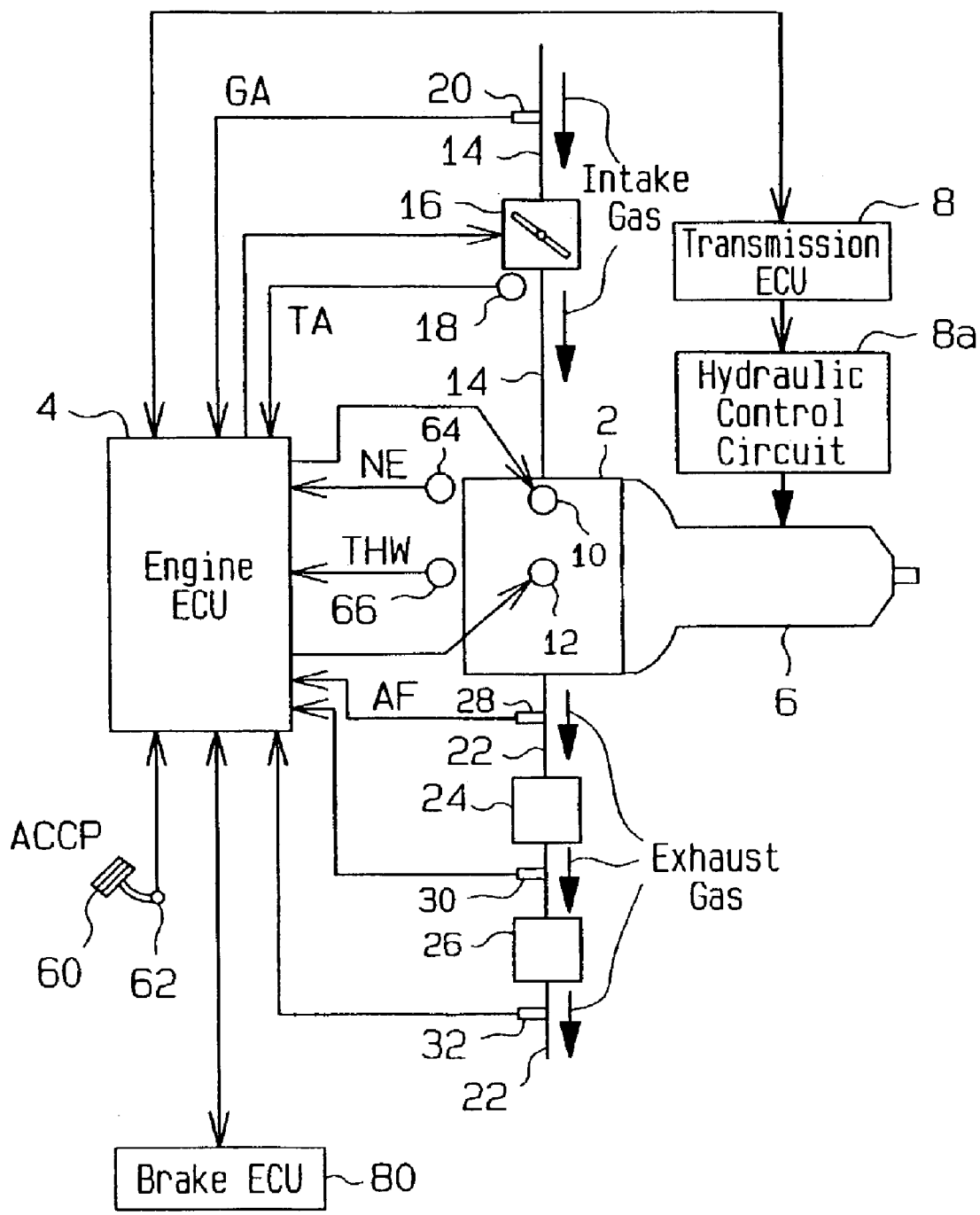
FIG. 1 is a diagrammatic view showing an engine, an automatic transmission, and a control system according to a first embodiment.

FIG. 1 shows an in-cylinder fuel injection type gasoline engine 2, an electronic control unit (ECU) 4 for the engine 2, a power transmission, which is an automatic transmission 6, and an electronic control unit (ECU) 8 for the automatic transmission 6.

The engine 2 has cylinders (only one of which is shown in FIG. 1). In each of the cylinders, a combustion chamber is defined. The engine 2 also has fuel injection valves 10 and spark plugs 12. Each fuel injection valve 10 directly injects fuel into the combustion chamber of one of the cylinders, and the corresponding spark plug 12 ignites the injected fuel. An intake passage 14 is connected to the combustion chambers through intake valves (not shown). A throttle valve 16 is provided in the intake passage 14. The opening degree (throttle opening degree TA) of the throttle valve 16 is adjusted by a motor. An intake amount GA (mg/sec) to the cylinders is controlled according to the throttle opening degree TA. The throttle opening degree TA is detected by a throttle sensor 18. The intake amount GA is detected by an intake amount sensor 20. The detected throttle opening degree TA and the detected intake amount GA are sent to the engine ECU 4.

An exhaust passage 22 is connected to the combustion chambers through exhaust valves (not shown). A three-way catalyst, which is a starting catalyst 24, is located in an upstream section of the exhaust passage 22. An occlusion reduction type NOx catalyst 26 is located in a downstream section of the exhaust passage 22.

An air-fuel ratio sensor 28 is located upstream of the starting catalyst 24. The air-fuel ratio sensor 28 detects an air-fuel ratio based on the components in exhaust. A first oxygen sensor 30 is located between the starting catalyst 24 and the NOx catalyst 26. A second oxygen sensor 32 is located downstream of the NOx sensor 26. The first and second oxygen sensors 30, 32 detect oxygen in the exhaust components.

The automatic transmission 6 has in it a torque converter and a gearbox. The automatic transmission 6 transmits power of the engine 2 to the gearbox through the torque converter to shift gears and outputs the power to driving wheels. A transmission ECU 8 adjusts combinations of engagement and disengagement of inner clutches and brakes using a hydraulic control circuit 8a according to the running state of the vehicle, the running state of the engine 2, and the shifting by the driver, such that the automatic transmission 6 is shifted to a demanded gear ratio.

Figure 2:
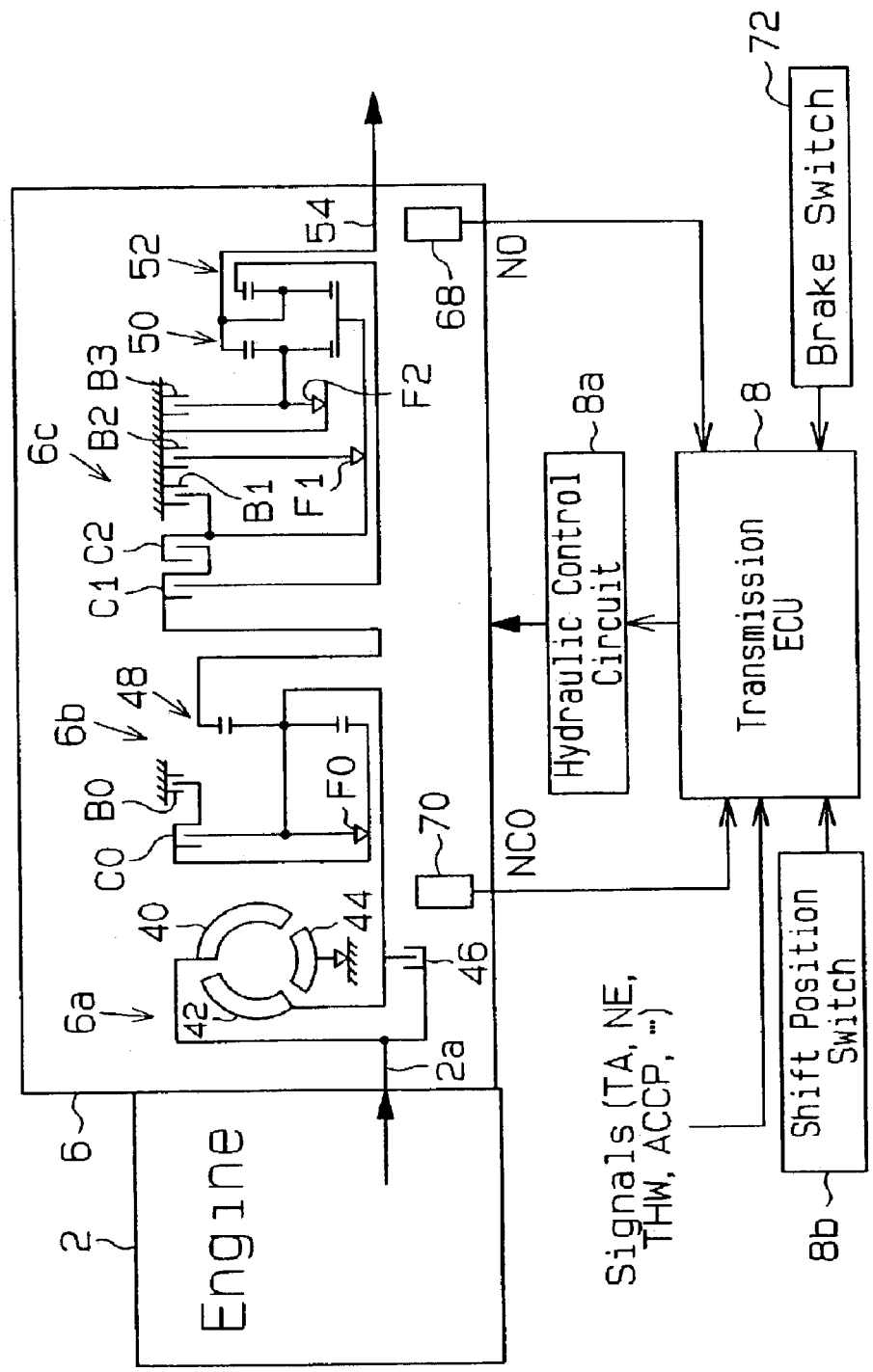
FIG. 2 is a diagrammatic view showing the automatic transmission and the control system shown in FIG. 1.

FIG. 2 diagrammatically shows the automatic transmission 6 and a control system of the automatic transmission 6. The automatic transmission 6 includes a torque converter 6a, an overdrive mechanism 6b, and an underdrive mechanism 6c. The underdrive mechanism 6c has three forward gears and one reverse gear. The torque converter 6a includes an pump impeller 40, a turbine runner 42, a stator 44, and a lockup mechanism 46. The torque converter 6a transmits power of a crankshaft 2a of the engine 2 from the pump impeller 40 to the turbine runner 42 through fluid.

The overdrive mechanism 6b receives power from the torque converter 6a. The overdrive mechanism 6b has a planetary gear train 48 having a sun gear, a ring gear, a planetary pinion, and a carrier. The rotation state of the planetary gear train 48 is adjusted by a clutch C0, a brake B0, and a one-way clutch F0.

The underdrive mechanism 6c receives power from the overdrive mechanism 6b. The underdrive mechanism 6c has two planetary gear trains 50, 52 having a common sun gear. The planetary gear trains 50, 52 include two ring gears, two planetary pinions, and two carriers. The rotation state of the planetary gear trains 50, 52 and the coupling state between the planetary gear trains 50, 52 and the overdrive mechanism 6b are adjusted by clutches C1, C2, brakes B1, B2, B3, and one-way clutches F1, F2.

When shifting gears, the transmission ECU 8 engages and disengages the clutches C0, C1, C2 and the brakes B0, B1, B2, B3 through the hydraulic control circuit 8a. The clutch C1 (a forward clutch) enables and disables a power transmission path from the engine 2 to the driving wheels. When the automatic transmission 6 is in one of the forward ranges (a "D" range, a "2" range, and an "L" range), the clutch C1 is engaged to enable the power transmission path. The hydraulic control circuit 8a is capable of arbitrarily adjusting hydraulic pressure applied to the clutch C1. The transmission ECU 8 is capable of performing a neutral control, which will be discussed later.

The engine ECU 4 and the transmission ECU 8 are control circuits each having a digital computer as a dominant constituent.

The engine ECU 4 receives signals from the throttle sensor 18, the intake amount sensor 20, the air-fuel ratio sensor 28, and the two oxygen sensors 30, 32. The engine ECU 4 also receives signals from an acceleration pedal sensor 62 and an engine speed sensor 64. The acceleration pedal sensor 62 detects the depression degree of an acceleration pedal 60, or an acceleration pedal depression degree ACCP, and the engine speed sensor 64 detects the engine speed NE based on rotation of the crankshaft 2a. The engine ECU 4 further receive signals from a coolant temperature sensor 66 and a vehicle speed sensor 68. The coolant temperature sensor 66 detects the temperature of coolant of the engine 2, or coolant temperature THW. Although not illustrated, sensors other than those listed above necessary for the engine control are provided.

The transmission ECU 8 receives signals from a shift position switch 8b, the throttle sensor 18, the acceleration pedal sensor 62, the engine speed sensor 64, and the coolant temperature sensor 66. The shift position switch 8b detects the position of the shift lever, which is selected by a driver. The transmission ECU 8 also receives signals from the vehicle speed sensor 68, a clutch speed sensor 70, and a brake switch 72. The vehicle speed sensor 68 detects the vehicle speed SPD based on rotation of an output shaft 54 of the automatic transmission 6. The clutch speed sensor 70 detects a rotational speed NC0 of the clutch C0. The brake switch 72 detects the braking state of a foot brake.

Based on detection results of the connected sensors, the engine ECU 4 controls the fuel injection timing, the fuel injection amount, the ignition timing, and the throttle opening degree TA of the engine 2. Accordingly, the combustion mode is, for example, switched between a stratified charge combustion and a homogeneous combustion. In the first embodiment, in a normal running state other than cases where the engine 2 is cold, the combustion mode is determined based on a map of the engine speed NE and a load factor eklq. Specifically, the stratified charge combustion is selected when the engine speed NE is low (including idling)

and the load factor eklq is low. In other cases, the homogeneous charge combustion is selected. The load factor eklq represents the ratio of the current load to the maximum engine load and is computed based on a map having parameters such as the acceleration pedal depression degree ACCP and the engine speed NE.

When the homogeneous charge combustion is selected, the homogenous charge combustion is performed at stoichiometric air-fuel ratio (in some cases, at a richer ratio) in the combustion chambers. Specifically, an amount of fuel that forms the stoichiometric ratio with the intake amount GA is computed, and the computed amount of fuel is injected during intake stroke. The air-fuel ratio can be richer than the stoichiometric air-fuel ratio in some cases. In this case, the exhaust air-fuel ratio is the stoichiometric air-fuel ratio (in some cases, richer than the stoichiometric air-fuel ratio). When the stratified charge combustion is selected, the throttle valve 16 is opened relatively wider, and an amount of fuel that is computed based on the load factor eklq and is less than the stoichiometric air-fuel ratio is injected in the compression stroke. In each combustion chamber, a lean stratified charge combustion is performed. In this case, the exhaust air-fuel ratio is lean.

As discussed below, the engine ECU 4 performs a catalyst temperature controlling process for the NOx catalyst 26, which is more affected by temperature than the starting catalyst 24 in the exhaust passage 22 is.

Based on detection results of the above described sensors, the transmission ECU 8 activates a solenoid valve in the hydraulic control circuit 8a according to a predetermined shift point map, which has parameters such as the throttle opening and the vehicle speed. The transmission ECU 8 changes the engagement of the clutches C0, C1, C2 and the brakes B0, B1, B2, B3, thereby shifting gears.

Figure 3:
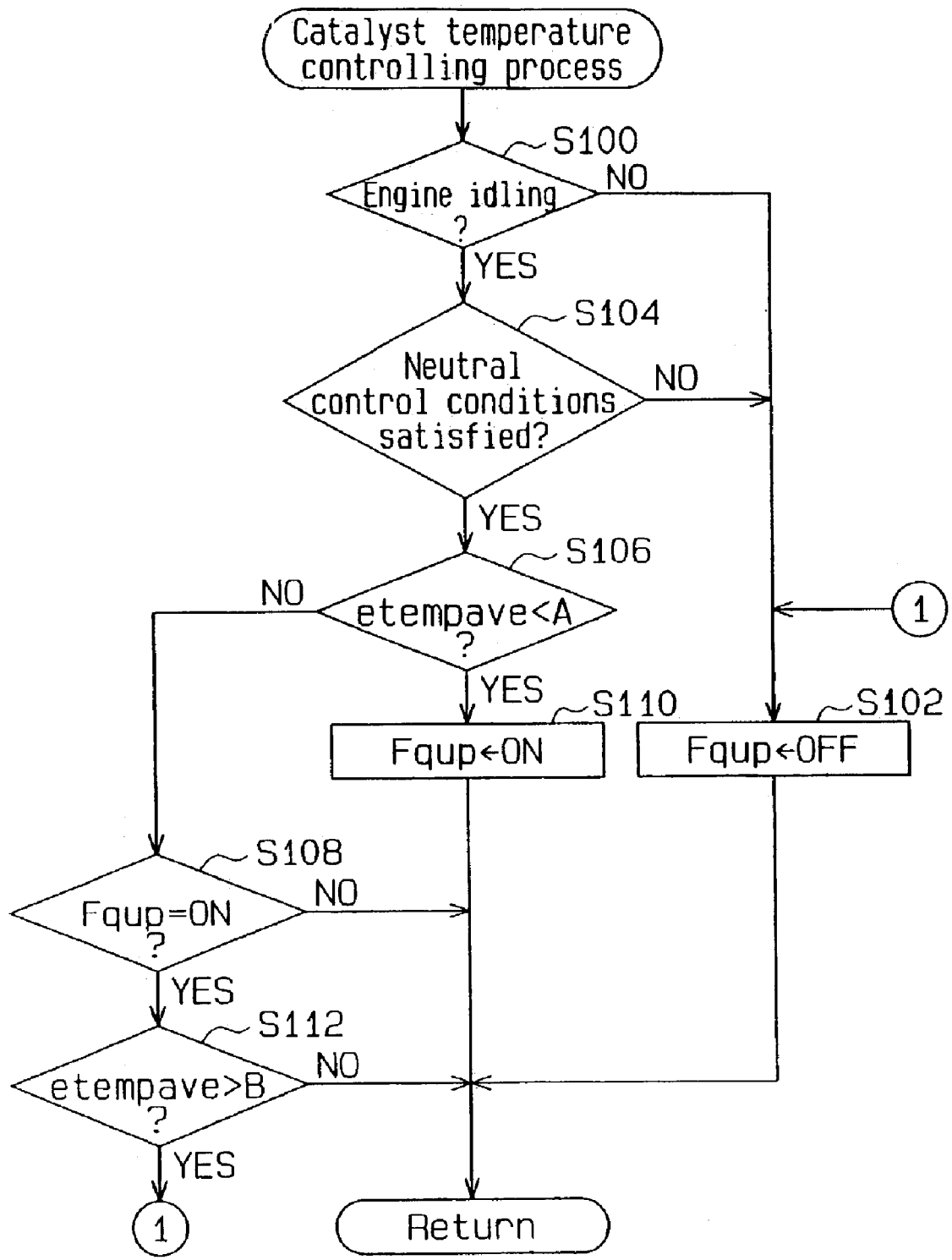
FIG. 3 is a flowchart showing a catalyst temperature controlling process executed by an engine ECU of the first embodiment.
Figure 9:
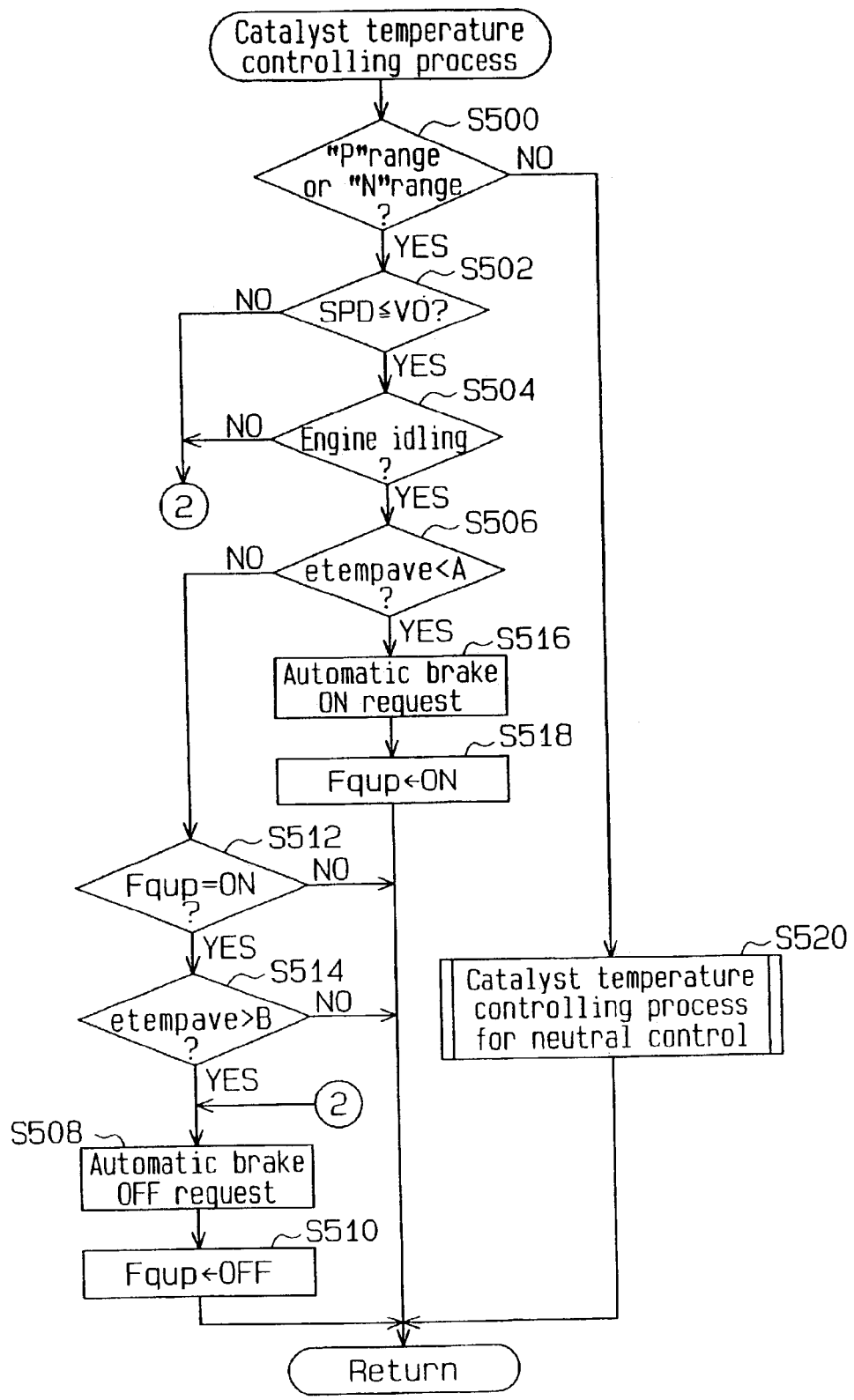
FIG. 9 is a flowchart showing a catalyst temperature controlling process executed by an engine ECU of a second embodiment.

The catalyst temperature controlling process, which is executed by the engine ECU 4 for controlling the temperature of the NOx catalyst 26, will now be described with reference to FIG. 3. The process of FIG. 9 is repeated at a predetermined interval.

In this process, whether the engine 2 is idling is determined in S100. If the outcome of step S100 is negative, or if the engine 2 is not idling, a load increase flag Fqup is set to OFF (S102). Then, the process is temporarily suspended.

If the outcome of S100 is positive, that is, if the engine 2 is idling, whether neutral control conditions are satisfied is determined (S104). In the neutral control, the clutch C1 is disengaged or the engaging force applied to the clutch C1 is decreased so that the clutch C1 slips in a forward gear position, thereby preventing the power of the engine 2 from being consumed at the torque converter 6a. As discussed below, the neutral control is executed in a shift controlling process executed by the transmission ECU 8 when the neutral control conditions are satisfied (S400 to S410). In step S104, whether these conditions are satisfied is determined.

If the outcome of step S104 is negative, or if the neutral control conditions are not satisfied, the load increase flag Fqup is set to OFF (S102) Then, the process is temporarily suspended.

If the outcome of S104 is positive, or if the neutral control conditions are satisfied, whether a catalyst temperature etempave is lower than a temperature determination value A is determined (S106). The temperature determination value A corresponds to a reference temperature and represents a lower limit value of a catalyst activating temperature. The catalyst temperature etempave is estimated based on the engine speed NE and the intake amount GA in a catalyst temperature estimation process executed by the engine ECU 4. In the catalyst temperature determination process, for example, the temperature etempave of the NOx catalyst 26 is estimated as an exhaust temperature that is computed based on the engine speed NE and the intake amount GA when the engine 2 is running in a stable manner. When the speed of the engine 2 is being changed, the catalyst temperature is repeatedly computed such that the catalyst temperature etempave follows the exhaust temperature based on a time constant of the intake amount GA. Instead of estimating the catalyst temperature, a temperature sensor may be provided in the NOx catalyst 26 to directly detect the catalyst temperature.

When the neutral control is actually executed, the process proceeds to step S108 if the temperature etempave of the NOx catalyst 26 is sufficiently high and an inequality etempave≧A is satisfied. That is, if the outcome of step S106 is negative, whether Fqup is ON is determined (S108). If Fqup has not been ON since the neutral control was started, or if the outcome of step S108 is negative, the process is temporarily suspended.

If the neutral control conditions are not satisfied when the inequality etempave≧A is satisfied (if the outcome of S104 is negative), and if the engine 2 is not idling (if the outcome of S100 is negative), the process is repeated as described above. Accordingly, the equation Fqup=OFF continues holding.

The engine ECU 4 executes a fuel injection controlling process (FIG. 4) at every predetermined crank angle (180° in an four-cylinder engine, 120° in a six-cylinder engine). The engine ECU 4 also executes an ignition timing controlling process (FIG. 5) at every predetermined crank angle. If Fqup is OFF, the fuel injection controlling process and the ignition timing controlling proves are executed in the following manner.

In the fuel injection controlling process (FIG. 4), whether Fqup is ON is initially determined (S200). In this case, the outcome of step S200 is negative. In S202, a combustion mode is selected in accordance with the running state of the engine 2 or a demand of rich spike. In step S202, in a normal running state other than cases where the engine 2 is cold, based on a map of the engine speed NE and the load factor eklq, the stratified charge combustion is selected if the load factor eklq is in a low range and the engine speed NE is in a low speed range including an idling range. In other cases, the homogeneous charge combustion is selected. When the occlusion amount of the NOx catalyst 26 approaches the saturation, a demand for rich-spike occurs. Accordingly, the homogeneous charge combustion is selected for reducing the NOx occluded in the NOx catalyst 26.

In S204, a target air-fuel ratio AFt is set in accordance with the running state of the engine 2 or a demand of rich spike. That is, if the homogeneous charge combustion is selected in step S202, a stoichiometric air-fuel ratio or a rich air-fuel ratio is set as the target air-fuel ratio AFt. If the stratified charge combustion is selected, the throttle valve 16 is opened relatively wide, and a lean air-fuel ratio is set as the target air-fuel ratio AFt, accordingly.

In S206, a fuel amount Q, which corresponds to the target air-fuel ratio AFt, is injected in an intake stroke if the stratified charge combustion is selected and is injected in a compression stroke if the homogeneous charge combustion is selected. Thereafter, the process is temporarily suspended.

In the ignition timing controlling process (FIG. 5), a demanded ignition timing θe is set according to the running state of the engine 2 (S300). For example, the demanded ignition timing θe is set based on a map of the engine speed NE and the load factor eklq.

In step S302, whether Fqup is ON is determined. In this case, the outcome of step S200 is negative. The demanded ignition timing θe is set as a target ignition timing θt in S304. In S306, the actual ignition is set to be performed at the target ignition timing θt. Thereafter, the process is temporarily suspended. The target ignition timing θt is set as an advance angle from a reference ignition timing.

Figure 6:
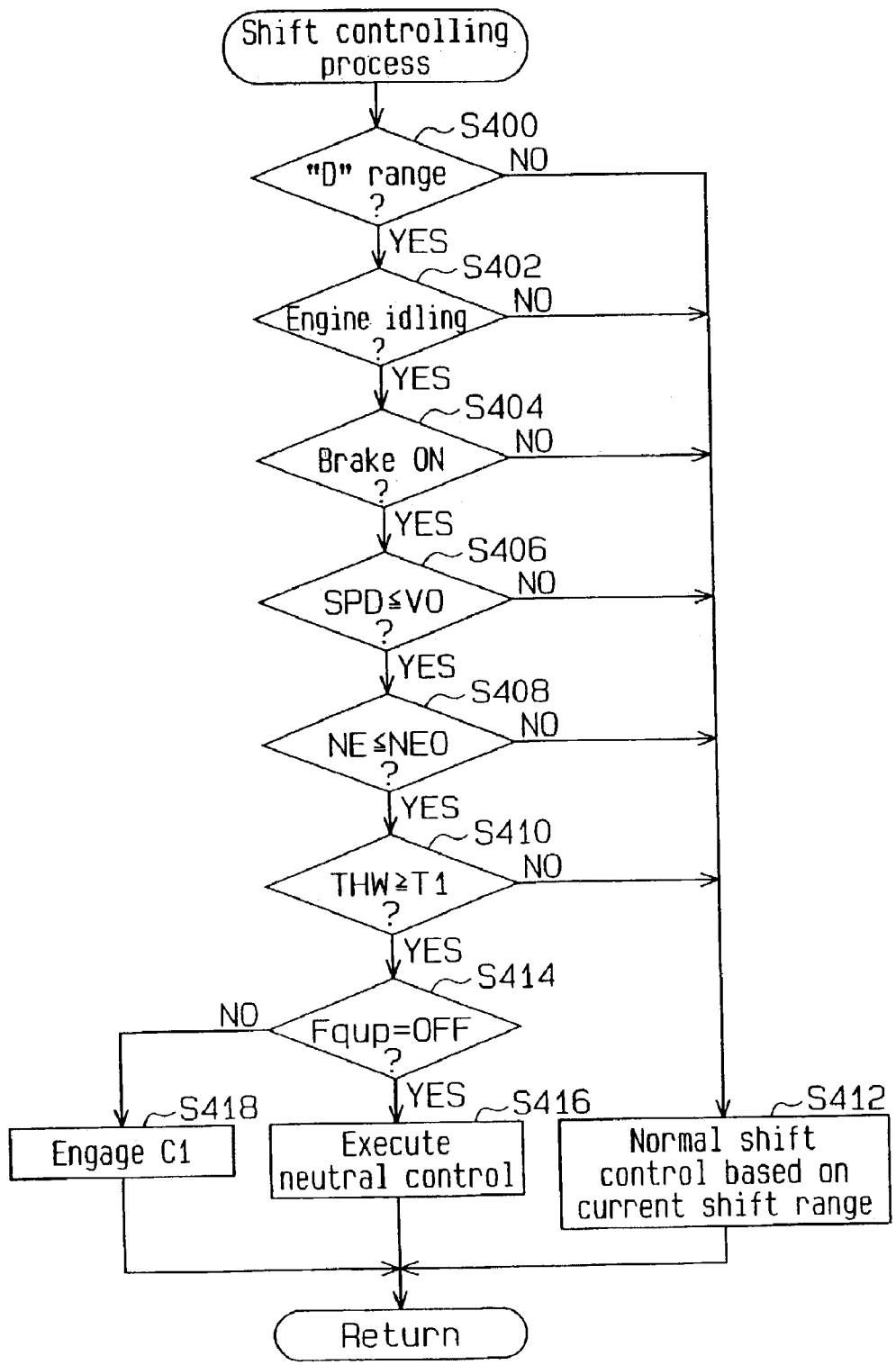
FIG. 6 is a flowchart showing a shift controlling process executed by a transmission ECU of the first embodiment.

The automatic transmission ECU 8 executes the shifting controlling process (FIG. 6). In the shifting controlling process, the automatic transmission ECU 8 performs the following procedure if Fqup is OFF. In S400, whether the shift position switch 8b is in the "D" range is determined. If the shift position switch 8b is not in the "D" range (if the outcome of S400 is negative), a normal shifting control that corresponds to the current shift range is executed (S412). Thereafter, the process is temporarily suspended. Ranges other than the "D" range include the "P" range, the "N" range, the "R" range, the "2" range, and the "L" range. In the "P" range, the "N" range, and the "R" range, the combination of engagement and disengagement of the inner clutches C0, C1, C2 and the brakes B0, B1, B2, B3 are adjusted according to the current range. In the "2" range and the "L" range, the combination of engagement and disengagement of the inner clutches C0, C1, C2 and the brakes B0, B1, B2, B3 are adjusted such that the gear ratio corresponds to the current range. FIG. 7 shows the engagement states in the automatic transmission 6. Circles in solid lines represent engagement.

If the shift is in the "D" range (if the outcome of S400 is positive), whether the engine 2 is idling is determined (S402) If the engine 2 is not idling (if the outcome of S402 is negative), the normal shifting control that corresponds to the current shift range is executed (S412). Thereafter, the process is temporarily suspended. As shown by circles with solid lines, the combination of engagement and disengagement of the clutches C0, C1, C2 and the brakes B0, B1, B2, B3 is adjusted such that a demanded gear ratio is realized.

If the engine 2 is idling (if the outcome of S402 is positive), whether the detection of the brake switch 72 is ON is determined (S404). That is, whether the vehicle is being braked by a foot brake is determined. If the detection of the brake switch 72 is OFF (if the outcome of S404 is negative), the normal shifting control that corresponds to the "D" range is executed (S412). Thereafter, the process is temporarily suspended.

If the detection of the brake switch 72 is ON (if the outcome of S404 is positive), whether the vehicle speed SPD detected by the vehicle speed sensor 68 is equal to or less than a stop determining speed V0 is determined (S406). The stop determining speed V0 indicates that the vehicle is not moving. If an inequality SPD>V0 is satisfied (if the outcome of S406 is negative), the normal shifting control that corresponds to the "D" range is executed (S412). Thereafter, the process is temporarily suspended.

If an inequality SPD≦V0 is satisfied (if the outcome of S406 is positive), whether the engine speed NE detected by the engine speed sensor 64 is equal to or less than an upper limit determining value NE0 is determined. The upper limit determining value NE0 is used to determine whether the engine speed NE is sufficiently low for performing the neutral control.

If an inequity NE>NE0 is satisfied (if the outcome of S408 is negative), the normal shifting control that corresponds to the "D" range is executed (S412). Thereafter, the process is temporarily suspended.

If an inequality NE≦NE0 is satisfied (if the outcome of S408 is positive), whether the engine coolant temperature THW detected by the coolant temperature sensor 66 is equal to or more than a warm-up determining temperature T1 is determined (S410). The warm-up determining temperature T1 is used for determining whether warm-up of the engine 2 is completed. If an inequity THW<T1 is satisfied (if the outcome of S410 is negative) and warm-up is not completed, the normal shifting control that corresponds to the "D" range is executed (S412). Thereafter, the process is temporarily suspended.

If an inequality THW≧T1 is satisfied, that is, if the outcome of step S410 is positive and warm-up is completed, whether the load increase flag Fqup is OFF is determined (S414) In this example, the load increase flag Fqup is OFF (the outcome of step S414 is positive). Therefore, the neutral control is executed (step S416). That is, since the conditions of steps S400 to S410 (the neutral control execution conditions in a normal state) are satisfied, the neutral control is started.

In the neutral control, even if the "D" range is detected by the shift position switch 8b, only the clutch C1 is in a disengaged state or a slipping state among the engagement states in FIG. 7. Therefore, when the engine 2 stops idling, rotation of the turbine runner 42 in the torque converter 6a is not or hardly restricted by the driving wheels, which are not moving. This lowers the load on the engine 2. Therefore, energy required for maintaining the target idle speed is reduced. The fuel injection amount is decreased, accordingly. The energy consumption is therefore reduced.

A further description to the catalyst temperature controlling process (FIG. 3) will now be presented. The following description will be given on the assumption that the low engine speed and the low engine load continue in the neutral control, and, due to an insufficient exhaust temperature and an insufficient exhaust flow rate, the catalyst temperature etempave of the NOx catalyst 26 is lowered below A (etempave<A). In this case, (the outcome of step S106 is positive), Fqup is set to ON (S110). Thereafter, the process is temporarily suspended.

Therefore, the fuel injection controlling process (FIG. 4), the ignition timing controlling process (FIG. 5), and the shift controlling process (FIG. 6) are executed in the following manners.

In the fuel injection control process (FIG. 4), since Fqup is ON (the outcome of step S200 is positive), the fuel injection timing is selected such that fuel is injected during compression stroke (S208) The target air-fuel ratio AFt is set to the stoichiometric air-fuel ratio (S210). Accordingly, the fuel amount Q is set to correspond to the target air-fuel ratio AFt and to be injected during compression stroke (S212). Thereafter, the process is temporarily suspended. In this manner, when Fqup is ON, a stratified charge combustion exceptionally with a stoichiometric air-fuel ratio is performed.

In the ignition timing control process (FIG. 5), the demanded ignition timing θe is set to correspond to the running state of the engine 2. Also, since Fqup is ON (the outcome of step S302 is positive), an ignition delay correction amount θd is subtracted from the demanded ignition timing θe to obtain a target ignition timing θt (S308).

$$\theta t \leftarrow \theta e - d\theta \tag{1}$$

The igniters are adjusted to ignite at the target ignition timing θt (S306). Thereafter, the process is temporarily suspended. Accordingly, the ignition timing is delayed by the ignition delay correction amount dθ.

In the gearshift control process (FIG. 6), when the outcomes of steps S400 to S410, which are the neutral control execution conditions, are positive, and the neutral control is being executed since Fqup is OFF, Fqup is switched to ON. In this case (a negative outcome in S414), the clutch C1 is engaged (S418) in the automatic transmission 6 under the neutral control state. Then, the process is temporarily suspended. That is, the automatic transmission 6 is in an engaged state equivalent to the engagement of the "D" range.

Accordingly, rotation of the turbine runner 42 is restricted by the stopped driving wheels and stopped. Therefore, the rotation load applied to the pump impeller 40 by the engine 2 is increased. Thus, in the idling speed control, the injection amount from the fuel injection valve 10 is increased to maintain the engine speed NE at the target idle speed. Further, as described above, a semi-stratified combustion is executed at the stoichiometric air-fuel ratio in the fuel injection controlling process (FIG. 4), which increases the exhaust temperature and the exhaust flow rate. Since the ignition timing is delayed in the ignition timing controlling process (FIG. 5), the exhaust temperature is further increased.

A great amount of the heated exhaust is supplied to the NOx catalyst 26, which increases the temperature of the catalyst 26. When the NOx catalyst 26 is cooled, a great amount of exhaust is supplied to the NOx catalyst 26. This state occurs only temporarily while the air-fuel mixture is not lean. Therefore, the starting catalyst 24 and the NOx catalyst 26 both effectively function as three-way catalysts and prevent excessive discharge of NOx.

Referring back to the catalyst temperature controlling process (FIG. 3), when the NOx catalyst 26 is heated by exhaust and the inequality etempave≧A is satisfied (a negative outcome in step S106), whether Fqup is ON is determined (S108). In this example, since the load increase flag Fqup is ON (the outcome of step S108 is positive), whether an inequality etempave>B is satisfied is determined (S112). The temperature determination value B is used for preventing hunting. An inequality B>A is satisfied.

Since the outcome of S112 is negative while an inequality etempave<B is satisfied, the process is temporarily suspended. Therefore, Fqup is maintained to ON, and exhaust continues to be heated in the fuel injection control process (FIG. 4), the ignition timing control process (FIG. 5), and the gearshift control process (FIG. 6).

When the temperature of the NOx catalyst 26 is increased and an inequality etempave>B is satisfied (a positive outcome in step S112), Fqup is set to OFF (step S102). Thereafter, the process is temporarily suspended.

Therefore, in the next execution of the catalyst temperature controlling process (FIG. 3), the inequality etempave≧A is satisfied (a negative outcome in S106) if the engine 2 is idling (a positive outcome in S100) and the neutral control execution conditions are satisfied (a positive outcome in S104). Then, the determination of step S108 is executed. However, since Fqup is OFF (a negative outcome in step S108), the process is temporarily suspended. Accordingly, the equation Fqup=OFF continues holding.

Figure 4:
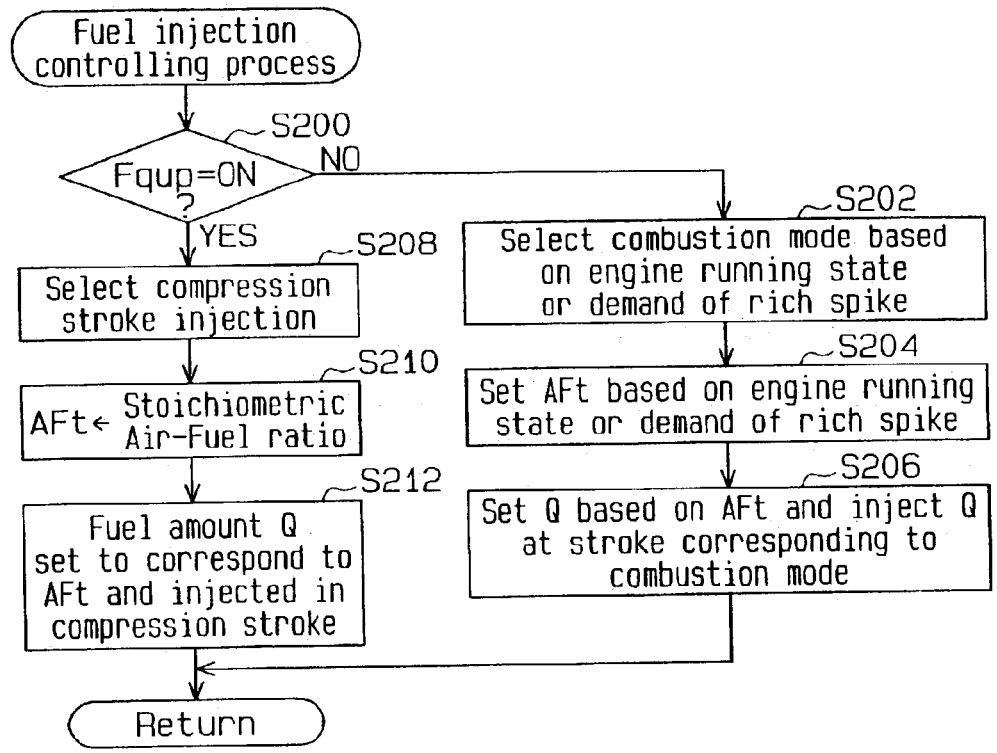
FIG. 4 is a flowchart showing a fuel injection controlling process executed by the engine ECU of the first embodiment.
Figure 5:
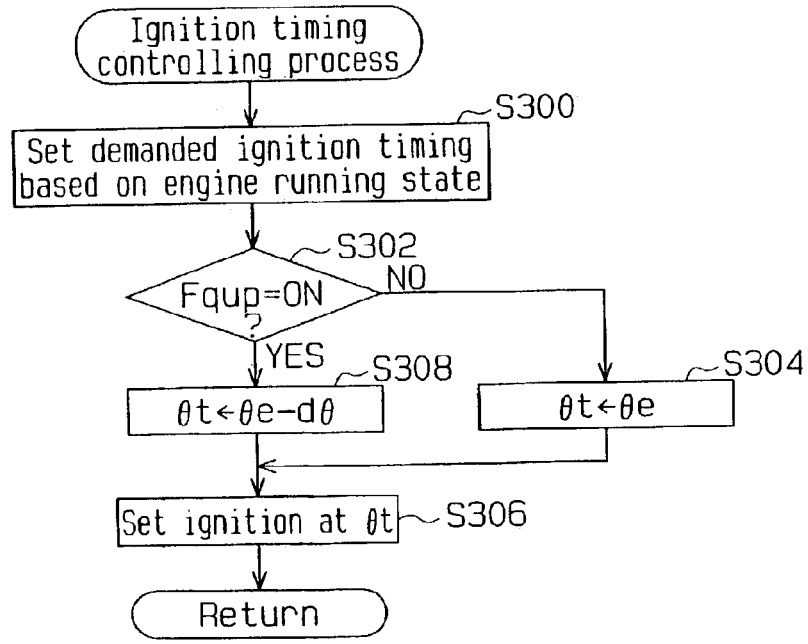
FIG. 5 is a flowchart showing an ignition timing controlling process executed by the engine ECU of the first embodiment.

Since Fqup is OFF, the normal injection control is performed in steps S202 to S206 of the fuel injection control process (FIG. 4). In the ignition timing control process (FIG. 5), also, the normal ignition timing is applied. In the shift controlling process (FIG. 6), the outcome of step S414 is positive. Therefore, the process returns to the neutral control (S416).

When the inequality etempave<A is satisfied again (a positive outcome in S106), the above process for heating exhaust is repeated.

Figure 8:
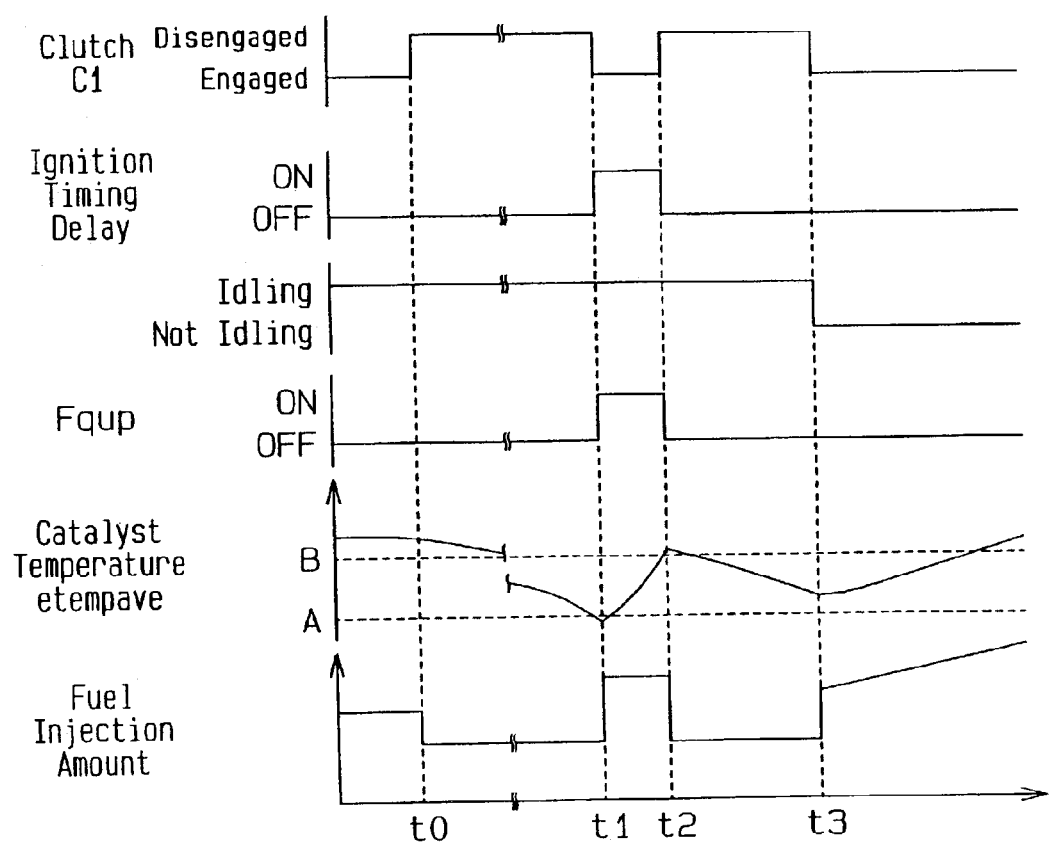
FIG. 8 is a timing chart showing an example of a process according to the first embodiment.

FIG. 8 shows an example of this embodiment. When all the neutral control execution-conditions (S400 to S410) are satisfied (t0), the neutral control is started, which either disengages the clutch C1 or permits the clutch C1 to slip, thereby reducing the engine load. Accordingly, the fuel injection amount is reduced. When the catalyst temperature etempave of the NOx catalyst 26 falls below the temperature determination value A (t1), the load increase execution flag Fqup is set to ON. This engages the clutch C1, and the ignition timing is delayed. Also, ignition is performed at compression stroke to form the stoichiometric air-fuel ratio. The fuel injection amount is therefore increased. When the catalyst temperature etempave is increased above the temperature determination value B (t2), the load increase execution flag Fqup is set to OFF, and the neutral control is resumed. This disengages the clutch C1 or causes the clutch C1 to skid, thereby decreasing the load on the engine 2. The fuel injection amount is further decreased. Thereafter, when any of the neutral control execution conditions (S400 to S410) is not satisfied (t3), the clutch C1 is engaged and the engine load is increased. The catalyst temperature etempave is increased, accordingly.

In the above described embodiment, the shift controlling process (FIG. 6) corresponds to a process of a clutch controlling device, the catalyst temperature controlling process (FIG. 3) corresponds to a process of a catalyst activating device and the process for estimating the catalyst temperature etempave corresponds to a process of a catalyst temperature detecting device. Steps S200, S208, and S212 of the fuel injection controlling process (FIG. 4) correspond to a process of a combustion mode changing device. Steps S302, S308 of the ignition timing controlling process (FIG. 5) correspond to a process of an ignition timing delaying device.

The first embodiment has the following advantages.

(A) The neutral control (S416) is executed according to the running state of the vehicle (S406), the running state of the engine 2 (S402, S408, S410), and the manipulation by the driver (S400, S404). When the clutch C1 is disengaged or slipping in the neutral control (S416), the engine load is decreased, and the exhaust temperature and the exhaust flow rate are lowered. If the catalyst temperature etempave falls below the temperature determination value A, accordingly (a positive outcome of S106 in FIG. 3), the clutch C1, which is disengaged or slipping in the neutral control, is completely engaged (S418 in FIG. 6). Accordingly, the amount of energy of the engine 2 that is converted into heat at the torque converter 6a is increased.

Therefore, the load on the engine 2 is increased, and the exhaust temperature and the exhaust flow rate are increased. Accordingly, the temperature of the NOx catalyst 26 is maintained in the neutral control, which sufficiently activates the catalyst. This maximizes the fuel economy and prevents exhaust from deteriorating.

(B) When the catalyst temperature etempave falls below the temperature determination value A, the ignition timing is delayed (S308 in FIG. 5), thereby increasing the exhaust temperature. Accordingly, the period of engagement of the clutch C1 is shortened. In other words, the clutch C1 is disengaged or returned to the slipping state at an early stage. This reduces the load on the engine 2 and thus improves the fuel consumption.

(C) Even during a homogeneous combustion in the neutral control, the fuel injection is performed in the compression stroke if the catalyst temperature etempave falls below the temperature determination value A, so that the combustion mode is switched to the semi-stratified combustion. This increases the exhaust temperature. Accordingly, the period of engagement of the clutch C1 is shortened further. In other words, the clutch C1 is disengaged or returned to the slipping state at an earlier stage. This reduces the load on the engine 2 and thus improves the fuel consumption.

Figure 10:
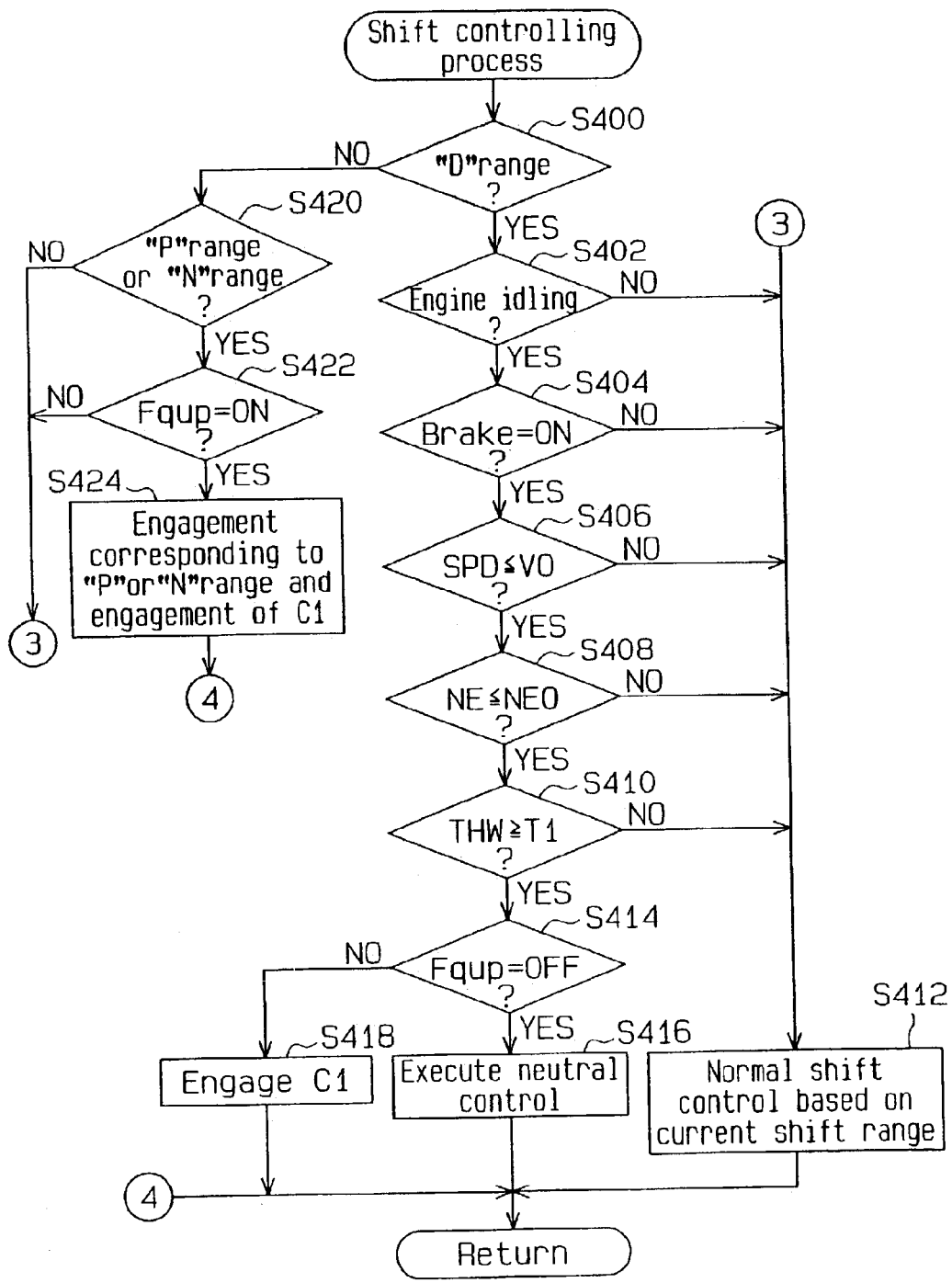
FIG. 10 is a flowchart showing a shift controlling process executed by a transmission ECU of the second embodiment.

A second embodiment of the present invention will now be described. In the second embodiment, a catalyst temperature controlling process of FIG. 9 is executed instead of the catalyst temperature controlling process of FIG. 3, and a shift controlling process of FIG. 10 is executed instead of the shift controlling process of FIG. 6. In FIG. 10, steps S400 to S418 are the same as those in FIG. 6.

Also, an automatic brake system is provided. The automatic brake system is capable of braking the vehicle even if the driver is not stepping on the brake pedal. One typical automatic brake system includes an oil pump and an accumulator. The oil pump pressurizes oil and sends the oil to the accumulator, so that pressure is accumulated. Instead of oil from a master cylinder, the pressurized oil in the accumulator is supplied to wheel cylinder by an automatic brake electromagnetic valve. The automatic brake electromagnetic valve is controlled by an automatic brake ECU 80 (see FIG. 1). In response to a braking request from the engine ECU 4, the automatic brake ECU 80 brakes the wheels to maintain the vehicle at a stationary state even if the driver is not depressing the brake pedal.

The catalyst temperature controlling process of FIG. 9 will now be described. The process of FIG. 9 is repeated at a predetermined interval.

First, whether the shift position is in the "P" range or the "N" range is determined in S500. If the shift position is not in the "P" range or the "N" range (the outcome of S500 is negative), a catalyst temperature controlling process for the neutral control is executed in S520. In the catalyst temperature controlling process for the neutral control corresponds to the catalyst temperature controlling process of FIG. 3, is similar to the first embodiment.

If the shift position is either in the "P" range or the "N" range, that is, if the outcome of S500 is positive, whether the vehicle speed SPD detected by the vehicle speed sensor 68 is equal to or less than the stop determining speed V0, which indicates that the vehicle is not moving, is determined. If an inequality SPD>V0 is satisfied (a negative outcome in S502), a request for turning off the automatic brake system (automatic brake OFF request) is sent to the automatic brake ECU 80 (S508).

When receiving the automatic brake OFF request, the automatic brake ECU 80 switches the automatic brake electromagnetic valve such that the pressurized oil from the accumulator is not supplied to the wheel cylinder. If the supply of oil from the accumulator to the wheel cylinder has already been stopped, the state of the automatic brake electromagnetic valve is maintained. In this state, the vehicle can be braked by depressing the brake pedal.

The load increase flag Fqup is set to OFF (S510). Then, the process is temporarily suspended.

In this manner, if Fqup is OFF when the shift position is the "P" range or "N" range, the outcome of step S400 is negative in the gearshift control (FIG. 10), and the outcome of step S420 is positive. Then, whether the load increase execution flag Fqup is ON is determined (S422). In this example, the outcome of step S422 is negative. Accordingly, the shift controlling process is performed according to the current gear shift range (S412).

Since Fqup is OFF, steps S202 to S206 are executed in the fuel injection control process (FIG. 4), and the combustion mode and the target air-fuel ratio AFt are set in accordance with the running state of the engine and demands of rich spike. The fuel injection is executed, accordingly. In the ignition timing controlling process (FIG. 5), steps S300 to S306 are executed, and the demanded ignition timing $\theta$e and the target ignition timing $\theta$t are set in accordance with the running state of the engine. Ignition is executed accordingly.

If an inequality SPD$\leq$V0 is satisfied (the outcome of S502 is positive), whether the engine is idling is determined (S504). If the engine is not idling (negative outcome in S504), an automatic brake OFF request is set to the automatic brake ECU (S508), and Fqup is set to OFF (S510). Therefore, the shift controlling process (FIG. 10), the fuel injection controlling process (FIG. 4), and the ignition timing controlling process (FIG. 5) are executed in the above described manner.

If the engine 2 is idling (if the outcome of S502 is positive), whether the catalyst temperature etempave is less than the temperature determination value A is determined (S506). The computation of the catalyst temperature etempave and the temperature determination value A are the same as those in the first embodiment.

The following description is based on the assumption that the driver shifts the gear to the "N" range (neutral position) or to the "P" range (parking position) immediately after the vehicle is stopped, the clutch C1 is disengaged, and the load on the engine 2 is reduced. In this case, if the temperature etempave of the NOx catalyst 26 is sufficiently high and equal to or higher than A (a negative outcome in step S506), whether Fqup is ON is determined (S512). If Fqup has not been ON, or if the outcome of step S512 is negative, the current process is temporarily suspended.

While the inequality etempave$\geq$A continues holding, if SPD exceeds V0 (a negative outcome in step S502) or if the idling of the engine is stopped (a negative outcome in step S504), steps S508, S510 are repeated, and Fqup continues being OFF and the automatic brake continues being OFF.

On the other hand, an inequality etempave<A is satisfied when a low speed and low load state continues with the shift being in the "N" range or the "P" range, and, due to an insufficient exhaust temperature and an insufficient exhaust flow rate, the catalyst temperature etempave in the NOx catalyst is lowered. In this case, the outcome of step S506 is positive.

Since the inequality etempave<A is satisfied when the engine 2 is idling immediately after the engine 2 has been started from a cold state, the outcome of step S506 is also positive.

Therefore, a request for turning on the automatic brake system (an automatic brake ON request) is sent to the automatic brake ECU in S516. Accordingly, the automatic brake ECU switches the automatic control brake electromagnetic valve such that oil having the pressure in the accumulator is supplied to the wheel cylinder. If oil having the pressure of the accumulator has already been supplied to the wheel cylinder, the state of the automatic brake electromagnetic valve is maintained. Thus, even if the driver is not depressing the brake pedal, the vehicle is braked. That is, a process corresponding to the brake controlling device is executed.

After step S516, the automatic brake ECU sets the load increase flag Fqup to ON (S518). Then, the engine ECU temporarily suspends the process.

Since Fqup is ON, steps S208 to S212 are executed in the fuel injection control (FIG. 4), and a semi-stratified charge combustion at a stoichiometric air-fuel ratio is performed. Further, in the ignition timing controlling process (FIG. 5), step S308 is executed to delay the ignition timing.

In the gearshift control process (FIG. 10), after the outcome of step S400 is negative and the outcome of step S420 is positive, step S424 is executed since Fqup is ON (a positive outcome in step S422). In step S424, the engagement state of the automatic transmission 6 corresponds to the "P" range or the "N" range, and the clutch C1 is engaged as shown by circles of broken lines in FIG. 7. That is, the state of the automatic transmission 6 is the same as when the "D" range is selected.

Thus, as in the case where step S418 of the first embodiment is executed, the rotation of the turbine runner 42 is stopped by the stopped driving wheels. Therefore, the rotation load applied to the pump impeller 40 by the engine 2 is increased. Thus, in the idling speed control, the injection amount from the fuel injection valve 10 is increased to maintain the engine speed NE at the target idle speed.

Further, as described above, a semi-stratified combustion is executed at the stoichiometric air-fuel ratio in the fuel injection controlling process (FIG. 4), which increases the exhaust temperature and the exhaust flow rate. Since the ignition timing is delayed in the ignition timing controlling process (FIG. 5), the exhaust temperature is further increased.

A great amount of the heated exhaust is supplied to the NOx catalyst 26, which increases the temperature of the catalyst 26. When the NOx catalyst 26 is cooled, a great amount of exhaust is supplied to the NOx catalyst 26. However, as described in the first embodiment, the amount of NOx in exhaust will be sufficiently small.

Referring back to the catalyst temperature controlling process (FIG. 9), when the NOx catalyst 26 is heated by exhaust and the inequality etempave≧A is satisfied (a negative outcome in step S506), whether Fqup is ON is determined (S512). In this example, since the load increase flag Fqup is ON (the outcome of step S512 is positive), whether an inequality etempave>B is satisfied is determined (S514). As described in the first embodiment, the inequality B>A is satisfied.

Initially, since an inequality etempave<B is satisfied (a negative outcome in S514), the process is temporarily suspended. Therefore, Fqup is maintained to ON, and exhaust continues to be heated in the fuel injection control process (FIG. 4), the ignition timing control process (FIG. 5), and the gearshift control process (FIG. 10).

When the temperature of the NOx catalyst 26 is increased and an inequality etempave>B is satisfied (a positive outcome in step S514), the automatic brake OFF request is generated (S508) and Fqup is set to OFF (S510). Thereafter, the process is temporarily suspended. Therefore, the shift controlling process (FIG. 10), the fuel injection controlling process (FIG. 4), and the ignition timing controlling process (FIG. 5) are executed in the above described normal manner.

In the next execution of the catalyst temperature controlling process (FIG. 9), the outcome of step S512 is negative. Then, the process is temporarily suspended. Accordingly, the state in which the automatic brake is OFF and Fqup is OFF continues.

When the inequality etempave<A is satisfied again (a positive outcome in S506), the above process for heating exhaust is repeated.

Figure 11:
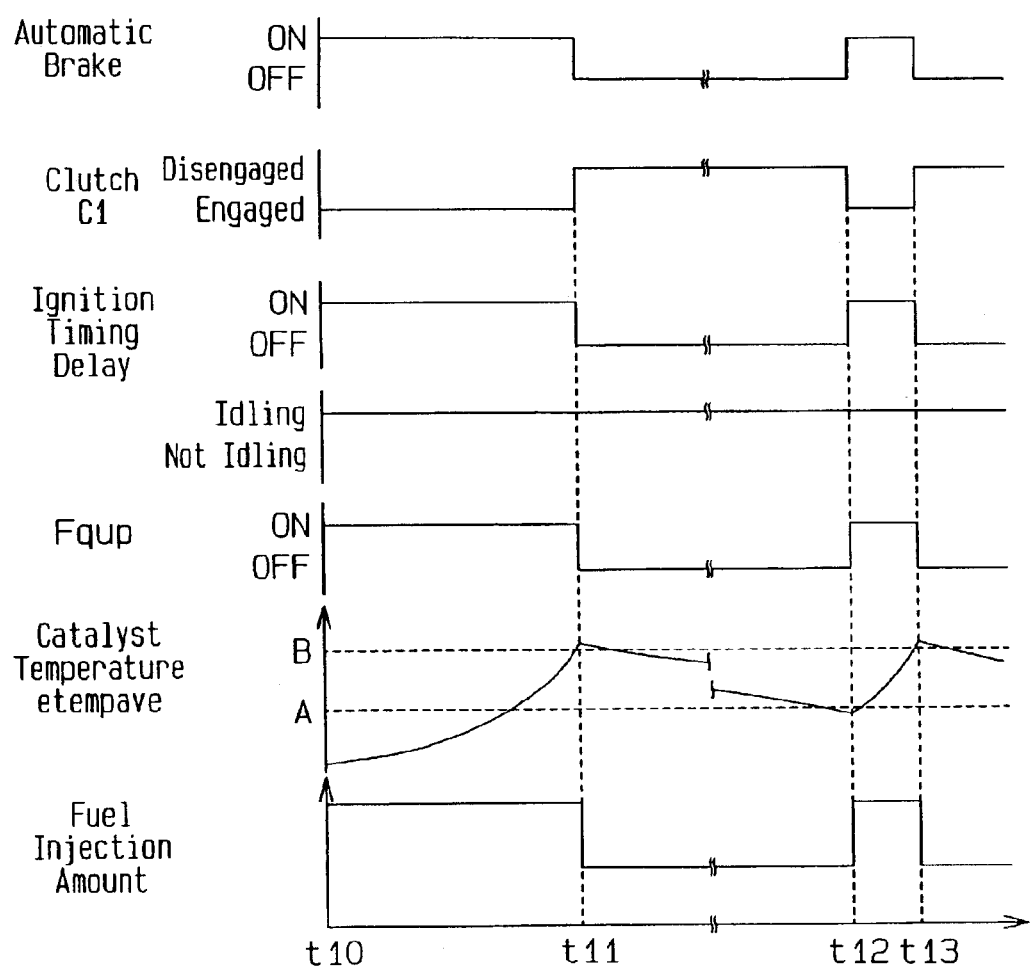
FIG. 11 is a timing chart showing an example of a process according to the second embodiment.

FIG. 11 shows an example of this embodiment. After the engine 2 is started from a cold state (from t10), if the catalyst temperature etempave is lower than the temperature determination value A with the shift being in the "P" range or the "N" range (t10 to t11), the load increase execution flag Fqup is ON. The clutch C1 is thus engaged, and the ignition timing is delayed. Also, injection is performed at the stoichiometric air-fuel ratio in the compression stroke. This increases the fuel injection amount. Accordingly, the catalyst temperature etempave is promptly increased. At this time, the automatic brake prevents the vehicle from creeping. When the catalyst temperature etempave exceeds the temperature determination value B (t11), the load increase execution flag Fqup is set to OFF, and the clutch C1 is disengaged. Also, the ignition timing and the fuel injection mode are returned to the previous state. The automatic brake is also set to OFF.

If the engine 2 continues idling and the catalyst temperature etempave again falls below the temperature determination value A (t12), the load increase execution flag Fqup is set to ON until the catalyst temperature etempave exceeds B (t13). Therefore, according to the above described process, the catalyst temperature etempave is promptly increased, and the automatic brake prevents the vehicle from creeping.

In the above described embodiment, the shift controlling process (FIG. 10) corresponds to a process of a clutch controlling device, the catalyst temperature controlling process (FIG. 9) corresponds to a process of a catalyst activating device and the process for estimating the catalyst temperature etempave corresponds to a process of a catalyst temperature detecting device. Steps S200, S208, and S212 of the fuel injection controlling process (FIG. 4) correspond to a process of a combustion mode changing device. Steps S302, S308 of the ignition timing controlling process (FIG. 5) correspond to a process of an ignition timing delaying device.

The second embodiment has the following advantages.

(A) When the driver shifts the automatic transmission 6 to the "N" range or the "P" range, the clutch C1 is disengaged in the shift controlling process (S412), which reduces the fuel consumption. However, since the load on the engine 2 is low, the exhaust temperature and the exhaust flow rate are lowered. If the catalyst temperature etempave falls below the temperature determination value A, accordingly (a positive outcome of S506 in FIG. 9), the clutch C1, which has been disengaged, is engaged (S424 in FIG. 10). If the catalyst temperature etempave is lower than the temperature determination value A when the automatic transmission 6 is in the "N" range or "P" range after the engine 2 has been started from a cold state (a positive outcome of S506 in FIG. 9), the clutch C1 is engaged (S424 in FIG. 10).

This increases the load on the engine 2, which increases the exhaust temperature and the exhaust flow rate. Even if the automatic transmission 6 is in the "N" range or the "P" range, the temperature of the NOx catalyst 26 is maintained or promptly increased so that the catalyst 26 is effectively activated. This maximizes the fuel economy and prevents exhaust from deteriorating.

(B) Since the clutch C1 is engaged when the transmission 6 is in the "N" range or the "P" range, the vehicle tends to creep forward. However, the automatic brake stops the vehicle to prevent the vehicle from moving forward without the driver depressing the brake pedal.

(C) The second embodiment has the advantages (A) to (C) of the first embodiment.

It should be apparent to those skilled in the art that the present invention may be embodied in many other specific forms without departing from the spirit or scope of the invention. Particularly, it should be understood that the invention may be embodied in the following forms:

(a) In the illustrated embodiments, the clutch C1, when disengaged or slipping, is completely engaged if the temperature of the NOx catalyst is low. This increases the load on the engine 2. Accordingly, the temperature of the NOx catalyst is increased by exhaust. Alternatively, the degree of the engagement of the clutch C1 may be increased to a degree between the current engagement state of the clutch C1 and the complete engagement.

For example, when the temperature of the NOx catalyst is low, the engaging pressure of the clutch C1 may be increased so that the clutch C1 is switched from a disengaged state to a slipping state or from a slipping state to a slipping state of a lower slipping ratio. This modification also provides the same advantages of the illustrated embodiments.

(b) In the illustrated embodiments, the torque converter is used. However, the present invention may be applied to a transmission having no torque converter. That is, in a transmission having no torque converter, the present invention may be embodied by utilizing a slipping state of the clutch C1 or of an extra clutch other than the clutch C1. Particularly, when the temperature of the NOx catalyst is low, the clutch is switched from the disengaged state to the slipping state or from the slipping state to an engaged state, thereby increasing the engine load. This maintains or increases the temperature of the NOx catalyst.

The present invention may be applied to, for example, a twin clutch transmission. In this case, the engagement degree of one of the clutches that is transmitting power is adjusted according to the temperature of the NOx catalyst.

In the illustrated embodiments, the present invention is applied to automatic transmissions. However, the present invention may be applied to a manual transmission. That is, the present invention may be applied to any type of power transmitting apparatus that automatically adjusts the engagement state of a clutch in a power transmitting path.

(c) In the illustrated embodiments, when the temperature of the NOx catalyst is low, the degree of the engagement of the clutch C1 is increased, the combustion mode is changed, and the ignition timing is delayed. However, one of the process for changing the combustion mode and the process for delaying the ignition timing may be omitted. Alternatively, both controls may be omitted, and only the control for increasing the engaging force of the clutch C1 may be executed.

(d) In the illustrated embodiments, the present invention is applied to the in-cylinder fuel injection type gasoline engine 2. However, the present invention may be applied to other types of engine such as an engine that injects fuel into the intake port.

The present examples and embodiments are to be considered as illustrative and not restrictive and the invention is not to be limited to the details given herein, but may be modified within the scope and equivalence of the appended claims.

What is claimed is:

1. A catalyst activation controlling apparatus for an emission control catalyst in an internal combustion engine, wherein the engine outputs vehicle driving power through a power transmission that includes a clutch, wherein the clutch enables and disables a power transmission path between a driving wheel of a vehicle and the engine, wherein the emission control catalyst is located in an exhaust passage of the engine, wherein the apparatus activates the catalyst based on a temperature of the catalyst, the apparatus comprising:

a clutch controlling device, which switches a degree of engagement of the clutch according to at least one of a running state of the vehicle, a running state of the engine, and manipulation of the transmission by a driver: and a detecting device, which detects the temperature of the emission control catalyst, wherein, when the clutch controlling device is decreasing the degree of engagement of the clutch, the clutch controlling device increases the degree of engagement of the clutch if the temperature of the emission control catalyst detected by the detecting device is less than a reference temperature, and wherein, if a condition that the transmission is shifted to a forward range while the engine is running is satisfied, the clutch controlling device executes a control for decreasing the degree of engagement of the clutch.

2. A catalyst activation controlling apparatus for an emission control catalyst in an internal combustion engine, wherein the engine outputs vehicle driving power through a power transmission that includes a clutch, wherein the clutch enables and disables a power transmission path between a driving wheel of a vehicle and the engine, wherein the emission control catalyst is located in an exhaust passage of the engine, wherein the apparatus activates the catalyst based on a temperature of the catalyst, the apparatus comprising:

a clutch controlling device, which switches a degree of engagement of the clutch according to at least one of a running state of the vehicle, a running state of the engine, and manipulation of the transmission by a driver: and a detecting device, which detects the temperature of the emission control catalyst, wherein, when the clutch controlling device is decreasing the degree of engagement of the clutch, the clutch controlling device increases the degree of engagement of the clutch if the temperature of the emission control catalyst detected by the detecting device is less than a reference temperature, and wherein, if a condition that the transmission is shifted to a forward range while the engine is running and the vehicle is not moving is satisfied, the clutch controlling device executes a control for decreasing the degree of engagement of the clutch.

3. A catalyst activation controlling apparatus for an emission control catalyst in an internal combustion engine, wherein the engine outputs vehicle driving power through a power transmission that includes a clutch, wherein the clutch enables and disables a power transmission path between a driving wheel of a vehicle and the engine, wherein the emission control catalyst is located in an exhaust passage of the engine, wherein the apparatus activates the catalyst based on a temperature of the catalyst, the apparatus comprising:

a clutch controlling device, which switches a degree of engagement of the clutch according to at least one of a running state of the vehicle, a running state of the engine, and manipulation of the transmission by a driver: and a detecting device, which detects the temperature of the emission control catalyst, wherein, when the clutch controlling device is decreasing the degree of engagement of the clutch, the clutch controlling device increases the degree of engagement of the clutch if the temperature of the emission control catalyst detected by the detecting device is less than a reference temperature;

the apparatus further comprising a brake controlling device, wherein, when the clutch controlling device increases the degree of engagement of the clutch, the brake controlling device applies brake to the vehicle if no brake is being applied to the vehicle.

4. A vehicle having a driving wheel, comprising:

an internal combustion engine, which is mounted on the vehicle and has an exhaust passage;

a power transmission path for transmitting driving power generated by the engine to the driving wheel;

a clutch, which disenables and enables the power transmission path;

a transmission for changing a speed of the vehicle;

an emission control catalyst located in the exhaust passage of the engine;

an activation controlling device, which activates the catalyst based on a temperature of the catalyst;

a clutch controlling device, which switches a degree of engagement of the clutch according to at least one of a running state of the vehicle, a running state of the engine, and a manipulation state of the transmission: and a detecting device, which detects the temperature of the emission control catalyst, wherein, when the clutch controlling device is decreasing the degree of engagement of the clutch, the clutch controlling device increases the degree of engagement of the clutch if the temperature of the emission control catalyst detected by the detecting device is less than a reference temperature, and wherein, if a condition that the transmission is shifted to a forward range while the engine is running is satisfied, the clutch controlling device executes a control for decreasing the degree of engagement of the clutch.

5. A vehicle having a driving wheel, comprising:

an internal combustion engine, which is mounted on the vehicle and has an exhaust passage;

a power transmission path for transmitting driving power generated by the engine to the driving wheel;

a clutch, which disenables and enables the power transmission path;

a transmission for changing a speed of the vehicle;

an emission control catalyst located in the exhaust passage of the engine;

an activation controlling device, which activates the catalyst based on a temperature of the catalyst;

a clutch controlling device, which switches a degree of engagement of the clutch according to at least one of a running state of the vehicle, a running state of the engine, and a manipulation state of the transmission: and a detecting device, which detects the temperature of the emission control catalyst, wherein, when the clutch controlling device is decreasing the degree of engagement of the clutch, the clutch controlling device increases the degree of engagement of the clutch if the temperature of the emission control catalyst detected by the detecting device is less than a reference temperature, and wherein, if a condition that the transmission is shifted to a forward range while the engine is running and the vehicle is not moving is satisfied, the clutch controlling device executes a control for decreasing the degree of engagement of the clutch.

6. A vehicle having a driving wheel, comprising:

an internal combustion engine, which is mounted on the vehicle and has an exhaust passage;

a power transmission path for transmitting driving power generated by the engine to the driving wheel;

a clutch, which disenables and enables the power transmission path;

a transmission for changing a speed of the vehicle;

an emission control catalyst located in the exhaust passage of the engine;

an activation controlling device, which activates the catalyst based on a temperature of the catalyst;

a clutch controlling device, which switches a degree of engagement of the clutch according to at least one of a running state of the vehicle, a running state of the engine, and a manipulation state of the transmission: and a detecting device, which detects the temperature of the emission control catalyst, wherein, when the clutch controlling device is decreasing the degree of engagement of the clutch, the clutch controlling device increases the degree of engagement of the clutch if the temperature of the emission control catalyst detected by the detecting device is less than a reference temperature;

the vehicle further comprising a brake controlling device, wherein, when the clutch controlling device increases the degree of engagement of the clutch, the brake controlling device applies brake to the vehicle if no brake is being applied to the vehicle.

* * * * *